US012592244B2

(12) United States Patent
Jin et al.

(10) Patent No.: US 12,592,244 B2
(45) Date of Patent: Mar. 31, 2026

(54) REDUCED-BANDWIDTH SPEECH ENHANCEMENT WITH BANDWIDTH EXTENSION

(71) Applicant: STARKEY LABORATORIES, INC., Eden Prairie, MN (US)

(72) Inventors: Wenyu Jin, Eden Prairie, MN (US); Tao Zhang, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 317 days.

(21) Appl. No.: 17/912,912

(22) PCT Filed: Apr. 6, 2021

(86) PCT No.: PCT/US2021/025883
§ 371 (c)(1),
(2) Date: Sep. 20, 2022

(87) PCT Pub. No.: WO2021/207131
PCT Pub. Date: Oct. 14, 2021

(65) Prior Publication Data

US 2023/0169987 A1 Jun. 1, 2023

Related U.S. Application Data

(60) Provisional application No. 63/007,613, filed on Apr. 9, 2020.

(51) Int. Cl.
*G10L 21/02* (2013.01)
*G10L 21/0232* (2013.01)
(Continued)

(52) U.S. Cl.
CPC ........ *G10L 21/0232* (2013.01); *H04R 1/1083* (2013.01); *H04R 3/04* (2013.01)

(58) Field of Classification Search
CPC ... G10L 21/0232; G10L 21/02; G10L 21/038; G10L 25/12; G10L 25/30; G10L 21/0364;
(Continued)

(56) References Cited

U.S. PATENT DOCUMENTS 4,023,455 A * 5/1977 Peterson .................. G10H 1/08 84/DIG. 8
4,300,435 A * 11/1981 Schmoll, III .......... G10H 5/002 84/700

(Continued)

FOREIGN PATENT DOCUMENTS

EP 2211339 7/2010
EP 2211339 A1 * 7/2010 ........... H04R 25/505

(Continued)

OTHER PUBLICATIONS

Guilin Ma, F. Gran, F. Jacobsen and F. T. Agerkvist, "Adaptive Feedback Cancellation With Band-Limited LPC Vocoder in Digital Hearing Aids," in IEEE Transactions on Audio, Speech, and Language Processing, vol. 19, No. 4, pp. 677-687, May 2011, doi: 10.1109/TASL.2010.2057245. (Year: 2011).*

(Continued)

*Primary Examiner* — Douglas Godbold
*Assistant Examiner* — Mulugeta Tuji Dugda
(74) *Attorney, Agent, or Firm* — Mueting Raasch Group

(57) ABSTRACT

An ear-wearable electronic device is operable to apply a low-pass filter to the digitized voice signal to remove a high-frequency component and obtain a low-frequency component. Speech enhancement is applied to the low-frequency component. Blind bandwidth extension is applied to the enhanced low-frequency component to recover or synthesize an estimate of at least part of the high frequency component. An enhanced speech signal is output that is a
(Continued)

combination of the enhanced low-frequency component and the bandwidth-extended high frequency component.

18 Claims, 6 Drawing Sheets

(51) Int. Cl.
*G10L 25/12* (2013.01)
*H04R 1/10* (2006.01)
*H04R 3/04* (2006.01)

(58) Field of Classification Search
CPC .... H04R 1/1083; H04R 3/04; H04R 2225/43; H04R 25/507
See application file for complete search history.

(56) References Cited

U.S. PATENT DOCUMENTS 4,815,134 A * 3/1989 Picone .................... G10L 19/06 704/E19.017
5,247,347 A 9/1993 Litteral et al.
7,650,004 B2 1/2010 Durant
8,355,794 B2 1/2013 Lineaweaver et al.
8,953,716 B1 * 2/2015 Venkatasubramanian ................... H04L 25/061 375/285
11,290,802 B1 * 3/2022 Nandy .................... G10L 15/08
2009/0119111 A1 * 5/2009 Goto ..................... G10L 19/008 704/E19.023
2016/0240210 A1 * 8/2016 Lou ..................... G10L 21/0388
2017/0195791 A1 * 7/2017 Pedersen .............. H04R 1/1041

FOREIGN PATENT DOCUMENTS

EP 2071875 6/2011
JP 2008089982 A * 4/2008 ......... G10L 21/0364
WO WO-2006114101 A1 * 11/2006 ......... G10L 21/0208
WO WO-2017164881 A1 * 9/2017 ............. G01L 19/24
WO WO-2020035158 A1 * 2/2020 ............. G10L 17/00

OTHER PUBLICATIONS

Murakami et al., "Speech Enhancement Based on a Combined Higher Frequency Regeneration Technique and RBF Networks", IEEE Tencon 02, IEEE Region 10, Oct. 28-31, 2002, vol. 1, pp. 457-460.
Gerkmann, Timo, "Unbiased MMSE-Based Noise Power Estimation with Low Complexity and Low Tracking Delay", IEEE, 10 pages.
Rehr et al., "On the Importance of Super-Gaussian Speech Priors for Machine-Learning Based Speech Enhancement". IEEE, 2017, 10 pages.
Zhang et al., "Deep Learning for Environmentally Robust Speech Recognition: An Overview of Recent Developments", Sep. 21, 2018, 16 pages.
PCT Search Report and Written Opinion for PCT/US2021/025883 dated Jul. 14, 2021 (16 pages).

* cited by examiner

REDUCED-BANDWIDTH SPEECH ENHANCEMENT WITH BANDWIDTH EXTENSION

RELATED PATENT APPLICATIONS

This application is a U.S. National Stage application under 35 U.S.C. 371 of PCT Application No. PCT/US2021/025883 filed Apr. 6, 2021, which claims the benefit of U.S. Provisional Application No. 63/007,613, filed Apr. 9, 2020, the entire contents of which are hereby incorporated by reference.

SUMMARY

This application relates generally to ear-level electronic systems and devices, including hearing aids, personal amplification devices, and hearables. In one embodiment, an ear-worn electronic device is configured to be worn in, on or about an ear of a wearer. The ear-worn electronic device includes at least one microphone configured to convert sound that includes speech to an electrical signal. The device includes a loudspeaker/receiver, an analog to digital converter that converts the electrical signal to a digitized signal, and a processor operably coupled to the microphone, the loudspeaker, and the analog to digital converter. The processor is operable to apply a low-pass filter to the digitized signal to remove a high-frequency component and obtain a low-frequency component. The processor applies speech enhancement to the low-frequency component and applies blind bandwidth extension to the enhanced low-frequency component to recover or synthesize an estimate of at least part of the high frequency component. The processor outputs an enhanced speech signal via the loudspeaker/receiver that is a combination of the enhanced low-frequency component and the bandwidth-extended high frequency component.

In another embodiment, an ear-wearable electronic device includes at least one microphone configured to convert sound that includes speech to an electrical signal. The device includes a low-pass filter that obtains a low-frequency component from the electrical signal and a speech enhancement processor that uses machine-learning to produce a narrowband enhanced excitation signal from the low-frequency component. The device includes an excitation extension module that frequency-extends the enhanced narrowband excitation signal to a wideband enhanced excitation signal. The device also includes a linear predictive coder (LPC) that produces a spectral envelope extension from the low-frequency component. The device includes a loudspeaker that converts an enhanced speech signal into audio, the enhanced speech signal comprising a convolution of the wideband enhanced excitation signal and the spectral envelope extension.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below makes reference to the following figures.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
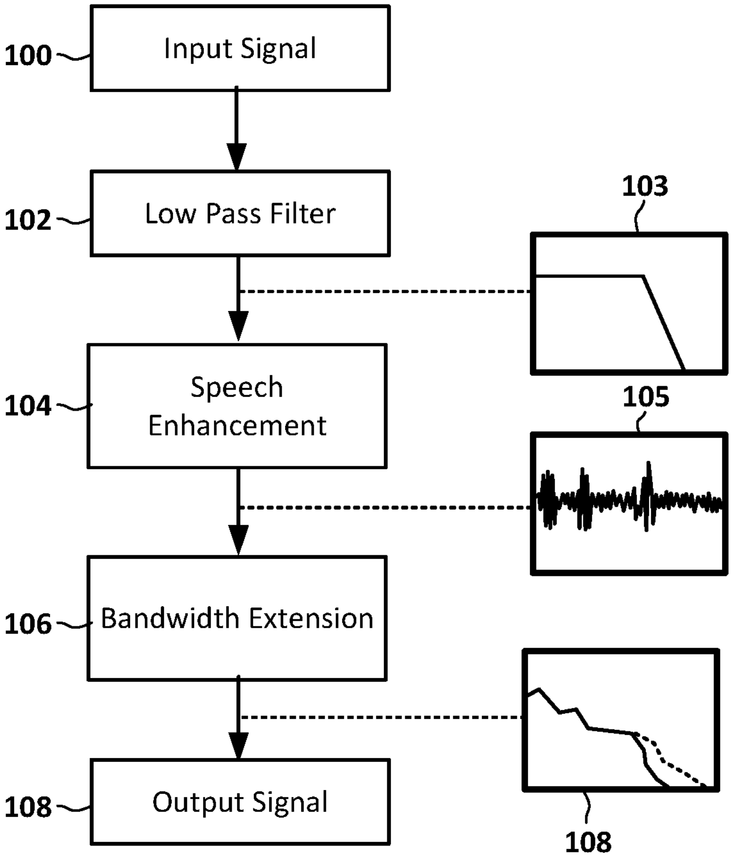
FIG. 1 is a high-level flowchart of a speech enhancement process according to an example embodiment.

Embodiments disclosed herein are directed to speech enhancement in an ear-worn or ear-level electronic device. Such a device may include cochlear implants and bone conduction devices, without departing from the scope of this disclosure. The devices depicted in the figures are intended to demonstrate the subject matter, but not in a limited, exhaustive, or exclusive sense. Ear-worn electronic devices (also referred to herein as "hearing devices"), such as hearables (e.g., wearable earphones, ear monitors, and earbuds), hearing aids, hearing instruments, and hearing assistance devices, typically include an enclosure, such as a housing or shell, within which internal components are disposed.

Typical components of a hearing device can include a processor (e.g., a digital signal processor or DSP), memory circuitry, power management and charging circuitry, one or more communication devices (e.g., one or more radios, a near-field magnetic induction (NFMI) device), one or more antennas, one or more microphones, buttons and/or switches, and a receiver/speaker, for example. Hearing devices can incorporate a long-range communication device, such as a Bluetooth® transceiver or other type of radio frequency (RF) transceiver.

The term hearing device of the present disclosure refers to a wide variety of ear-level electronic devices that can aid a person with impaired hearing. The term hearing device also refers to a wide variety of devices that can produce processed sound for persons with normal hearing. Hearing devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to a "hearing device," which is understood to refer to a system comprising a single left ear device, a single right ear device, or a combination of a left ear device and a right ear device.

Speech enhancement (SE) is an audio signal processing technique that aims to improve the quality and intelligibility of speech signals corrupted by noise. Due to its application in several areas such as automatic speech recognition (ASR), mobile communication, hearing aids, etc., several methods have been proposed for SE over the years. Recently, the success of deep neural networks (DNNs) in automatic speech recognition led to investigation of DNNs for noise suppression for ASR and speech enhancement. Generally, corruption of speech by noise is a complex process and a complex non-linear model like DNN is well suited for modeling it.

Although it has shown promising results and can outperform classical SE methods, the DNN-based speech enhancement system complexity and processing delay typically leads to a less feasible real-time architecture with high latency and computational cost, especially for highly constrained hearing aids. For example, a prototype DNN-based real-time speech enhancement system with a neural network containing three hidden layers (512 neurons for each of the layer) with four look-back frames, leads to approximately 40 ms processing delay. In contrast, the processing delay for a currently used fast-acting single microphone noise reduction (FSMNR) speech enhancement only takes 10 ms.

Generally, noisy speech in the real-world has frequency dependent signal-to-noise-ratio (SNR). For example, speech signals may exhibit higher SNR in low bands due to the main presence of speech (e.g., 0-5 kHz) and lower SNR in high bands (beyond 5 kHz). Because of lower SNR at high bands, higher risk of corrupting speech (e.g., distortion) is presented when attempting to remove noise. Moreover, total complexity of low band plus high band speech enhancement, especially DNN-based speech enhancement, can be significantly more costly than the low band enhancement only.

In this disclosure, various embodiments utilize speech enhancement schemes that perform speech processing on low band signals to reduce complexity of the speech enhancement algorithm. This reduced bandwidth speech enhancement is combined with blind bandwidth extension (BWE) processing to recover or synthesize high frequency bands from the speech-enhanced spectrum components at low frequency bands. Generally, BWE analyzes a narrowband signal to which a (typically) high frequency cutoff has been applied. Based on the speech-enhanced narrowband signal, the BWE algorithm predicts high frequency components which are then added to the signal thereby extending the spectrum of the signal. This is in contrast to other bandwidth extension schemes, which may explicitly encode details of the high frequency components in the narrowband signal for later decoding and extension.

Note that in the present disclosure, the terms "low band," "narrowband," "high band," "wideband," are not intended to imply specific frequency limits, but are used to indicate relative bandwidth in different stages of a signal processing stream. For example, a source signal may be passed through a low-pass filter to produce a narrowband signal that has lower bandwidth (e.g., smaller range between low and high frequencies present in the signal) than the source signal, but does not necessarily conform to established definitions of narrowband that may be commonly used in various audio signal technologies.

Using narrowband signals for speech detection/enhancement can reduce the complexity of advanced enhancement schemes (e.g., DNN-based speech enhancement) by computing enhancement only in the low frequency bands, which may require fewer bins or lower model order. The BWE is applied to the speech-enhanced signal, which improves the quality of the speech signal that is ultimately output by a loudspeaker/receiver of an ear-wearable device.

In FIG. 1, a flowchart shows a high-level representation of a speech enhancement process according to an example embodiment. An input signal 100 is provided by a transducer such as a microphone. The input signal 100 may be digitized via an analog-to-digital converter (ADC) for subsequent digital signal processing. The input signal 100 passes through a low-pass filter 102 which removes high-frequency components from the signal. The cutoff frequency for the filter 102 may be set within a range acceptable for speech processing. For example, traditional narrowband telephone speech is typically limited to around 3 kHz, and so the cutoff frequency could be set at or near 3 kHz. As will be described in greater detail below, the cutoff frequency can optionally be adapted during use, e.g., to account for changes in environmental noise.

The low-pass filter 102 outputs a band-limited signal 102 that includes speech plus noise that is processed via a speech enhancement module 104. Generally, the speech enhancement module identifies components of the signal that correspond to speech and may, for example, increase the amplitude of the speech components relative to everything else in the signal 103, the latter which could include ambient noise, electrical noise, etc. Because the speech enhancement module 104 operates on a reduced bandwidth signal, it can have lower complexity than a larger bandwidth speech enhancer. Thus, a bandwidth limited speech enhancement module 104 can be more readily implemented in a resource-limited device such as a hearing aid.

The result of processing by the speech enhancement module is an enhanced signal 105 in which speech can be heard more clearly over background noise and other non-speech components. The enhanced signal 105 is still bandwidth limited, however, and therefore may be missing some high frequency components of the speech. This reduction in bandwidth may result, for example, in unvoiced/fricative sounds being muted or inaudible.

In order to produce an output signal in which speech is more easily understood, the enhanced speech signal 105 is input to a bandwidth extender 106 that recovers and/or synthesizes high frequency content in the signal to create an increased bandwidth output signal 108. The increased bandwidth output signal 108 has an increase at least in high frequency portions of the speech signal, e.g., spectral bands above the cutoff frequency utilized by the low-pass filter 102.

Figure 2:
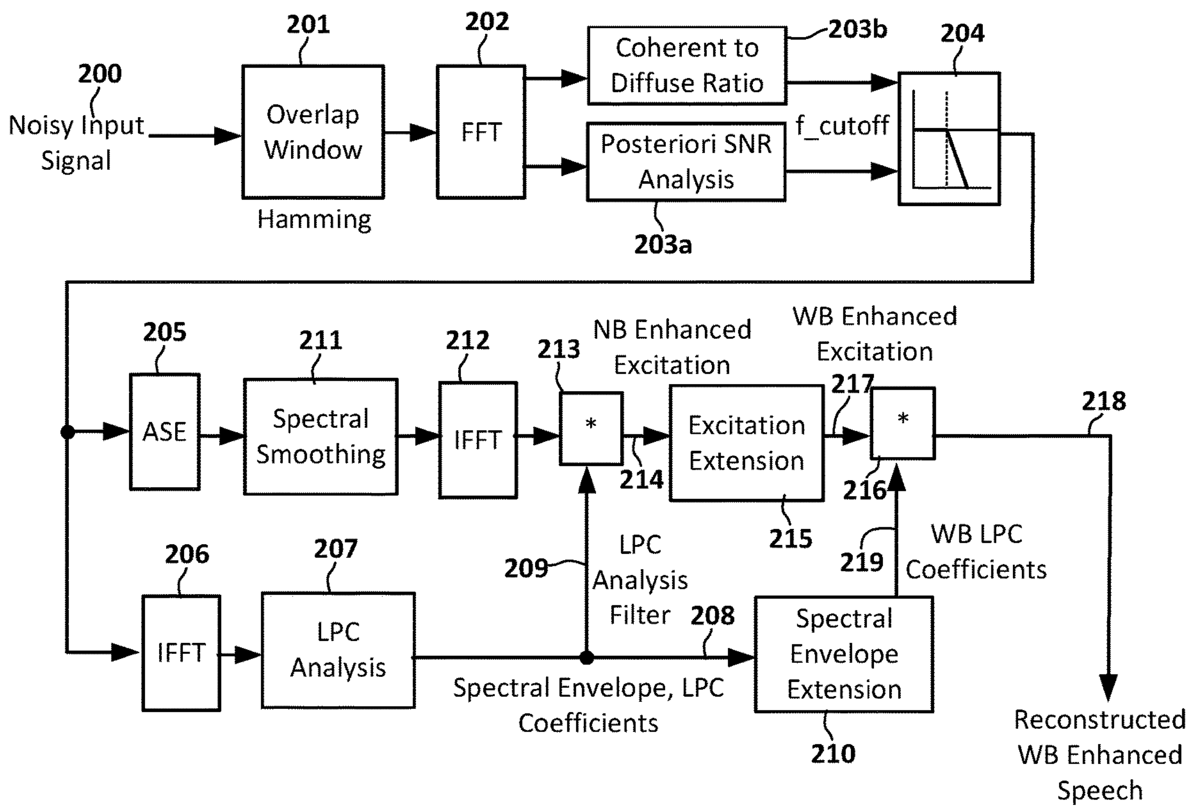
FIG. 2 is a signal processing diagram of a speech enhancement system according to an example embodiment.

In FIG. 2, a block diagram illustrates a more detailed signal processing path according to an example embodiment. A noisy input signal 200 is digitized (not shown) and input to a windowing function 201 which assembles consecutive samples into a window, where part of each window may overlap with previous windows. The samples in each window are transformed into the frequency domain via a fast Fourier transform (FFT) 202.

A posteriori SNR analysis 203*a* provides an estimate of signal quality for a selected range of frequencies. The posteriori SNR analysis 203*a* can be used to select a cutoff frequency f_cutoff used by a low-pass filter 204. This allows changing f_cutoff based on current noise characteristics of the input signal 200. Note that the use of the posteriori SNR analysis 203*a* for f_cutoff is optional, and f_cutoff can be a pre-set fixed value, and/or a user-configurable fixed value, e.g., based on a user-selected setting from a control application.

The posteriori SNR is one signal quality estimate that can be used to re-evaluate f_cutoff. In another embodiment, a coherent-to-diffuse power ratio (CDR) 203*b* can be used instead of or in addition to the posteriori SNR analysis 203*a* for determining f_cutoff. The CDR analysis 203*ba* is a sub-band analysis that assists in clarifying speech in highly reverberant environments. The CDR analysis 203*b* can be used to generate an input for DNN-based dereverberation. If DNN-based noise reduction and dereverberation are implemented simultaneously, a combination of the outputs of posteriori SNR analysis 203*a* and CDR analysis 203*b* can be used to determine the f_cutoff.

After the noisy input signal has been windowed and transformed into frequency domain, the low-pass cutoff filter 204 generally separates high and low frequency components used in subsequent stages of the speech enhancement processing. One reason to separate the high-band from the low-band is that noisy speech in real-world has frequency-dependent SNR, e.g., higher SNR in low bands due to the main presence of speech and lower SNR in high bands. Because of lower SNR at high bands, there higher risk of damaging speech (e.g., introducing distortion) when attempting to remove noise on the wideband signal. Therefore, using the narrowband, lower frequency signal for speech enhancement reduces risk of creating distortion when conducting speech enhancement. Also, as noted above, use of the lower frequency band can reduce computational complexity of the speech enhancement algorithm, which can be useful in low power devices.

After filter, the low-band portion of the signal is processed via an advanced speech enhancement (ASE) processor 205. The ASE processor 205 may be, in one embodiment, a DNN-based speech enhancer including noise reduction and dereverberation. Other machine learning algorithms may be used instead of or together with DNN-based speech enhancement, such as convolutional neural networks (SNN), recurrent neural networks (RNN), etc.

In parallel with the ASE processor 205, a linear predictive coding (LPC) analysis 207 is conducted on the low-pass signal, which is converted back to the time domain by an inverse FFT (IFFT) 206. The LPC analysis 207 derives LPC coefficients 208 and LPC analysis filter 209 based on the narrow-band, noisy spectral envelope. The LPC coefficients 208 can be derived using auto-correlation method and are served as the inputs for spectral envelope extension 210. The spectral envelope extension 210 generally involves a identifying feature sets in the signal and mapping technique between narrow-band and wideband feature sets. Relevant methods for spectral envelope extension include linear mapping based on codebooks, Bayesian estimation methods and DNN-based mapping. In some embodiments, a subset of the LPC coefficient 208 can selected for use by the spectral envelope extension based on a level of hearing loss of a user of the hearing assistance device. For example, if the user cannot hear frequencies higher than $f_h$, then LPC coefficients affecting frequencies above $f_h$ may be omitted from the spectral envelope extension 210.

The LPC analysis filter 209 is used for predicting the enhanced low-frequency excitation signal, which will serve as the input for excitation signal extension 215 for high frequency ranges. Generally, speech can be broken up into two parts: the excitation and the spectral envelope. In order to attain high quality wideband speech, both parts are typically extended. When considering a speech input signal that is band-limited, the assumption of the excitation being spectrally flat only holds for unvoiced frames. For voiced frames, the excitation signal includes of impulsive components placed at pitch harmonics. Therefore, the speech signal is first broken up into frames and classified as voiced and unvoiced frames via spectral flatness measure. Then different modulation strategies apply for unvoiced and voiced frames. For the excitation signal extension 215, spectral modulation methods may be used, including spectral band replication and spectral folding.

Similar to the excitation extension 215, in order to isolate the spectral envelope, spectral envelope extension 210 extrapolates the narrowband spectral envelope to that of the reconstructed wideband speech spectral envelope. This problem generally involves finding the right feature set and the right mapping technique between narrowband and wideband feature sets.

In reference again to the ASE processor 205, a spectral smoothing process 211 may be applied to the enhanced spectrum components at low frequency ranges that are output from the ASE processor 205. The spectral smoothing 211 is optional, and may deploy a moving window in the frequency domain in order to address spectrum discontinuity. The output of the spectral smoothing is inverse-transformed to the time domain via IFFT 212. As indicated by convolution block 213, the output of the IFFT 212 is filtered with the with LPC analysis filter 209 to get the excitation signal 214 based on the narrow-band enhanced signal. After the excitation signal extension 215, the wideband speech signal 218 is obtained by convolving 216 the wideband enhanced excitation signal 217 with the wideband LPC feature coefficients 219 (which are the output of spectral envelope extension 210).

As noted above, the cutoff frequency (f_cutoff) of the low-pass filter 204 defines what information in the input signal 200 is used for ASE processing 205 and which information is discarded. In some embodiments, the cutoff frequency may be actively adjusted during use by monitoring the active posteriori-SNR estimates. These estimates determine a cut-off frequency where signal components higher than the cut-off frequency have a high risk of creating distortion when conducting speech enhancement.

Figure 3:
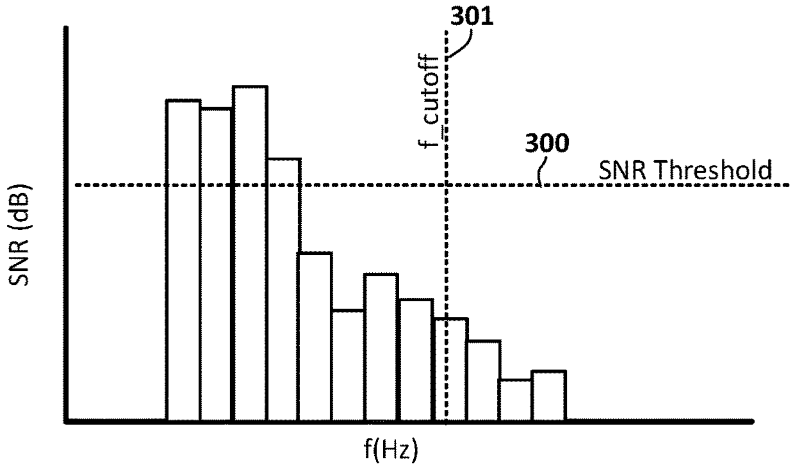
FIG. 3 is a plot illustrating the calculation of a cutoff frequency according to an example embodiment.

In FIG. 3, a plot shows how posteriori-SNR estimates may be used to select cutoff frequencies according to an example embodiment. In this plot, each of the bars represent the estimated posteriori-SNR for one of the analyzed bands. An SNR threshold 300 may be decided empirically (e.g., −6 dB) and a cutoff frequency 301 may be selected that ensures frequency bands below the cutoff frequency 301 have an average SNR that is below SNR threshold 300.

Figure 4A:
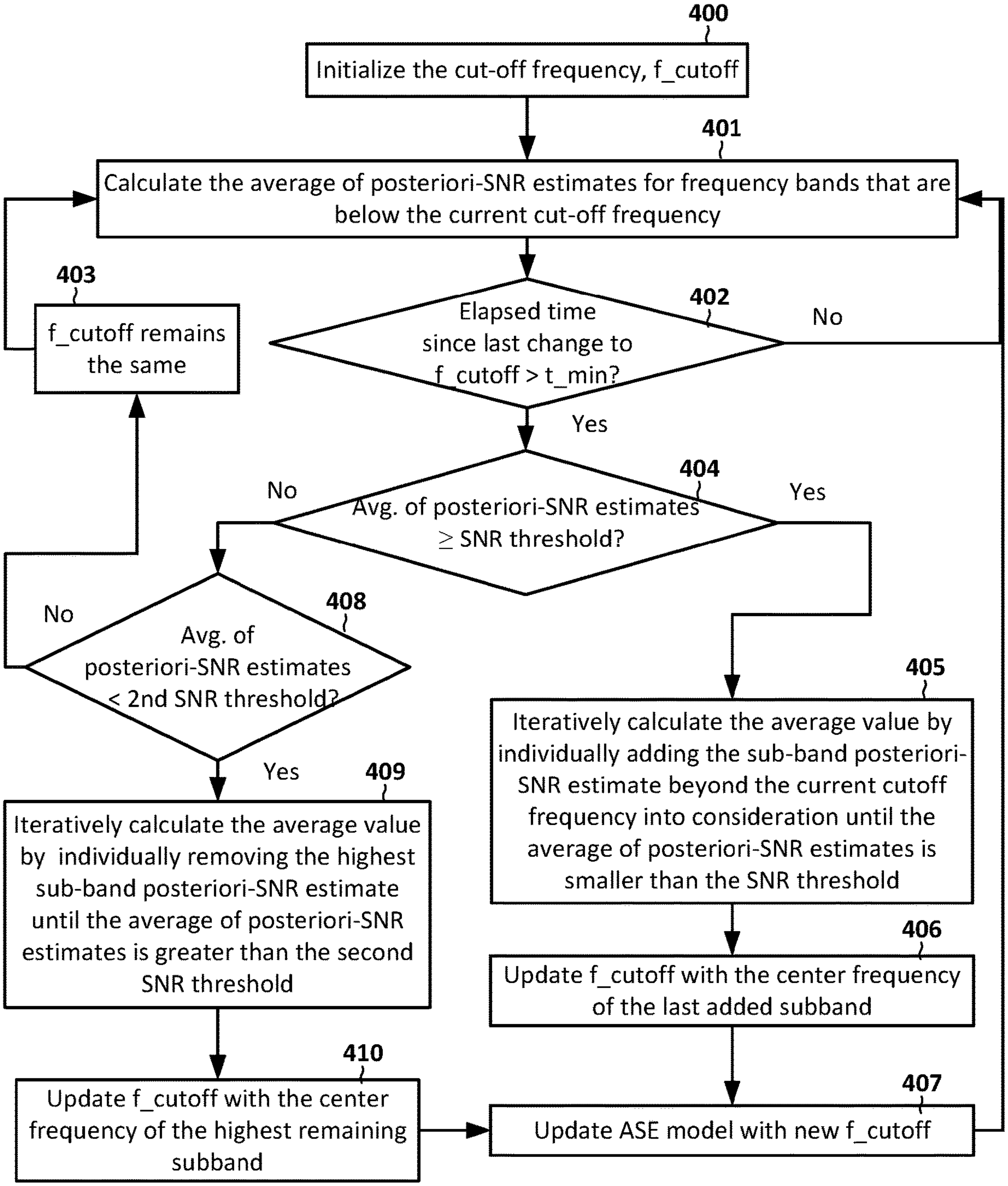
FIGS. 4A and 4B are flowcharts showing adaptive changing of cutoff frequency according to example embodiments.

In FIG. 4A, a flowchart shows an example of how f_cutoff may be actively adjusted according to an example embodiment. The procedure involves initializing 400 the cut-off frequency. For example, f_cutoff could be initially set to 3 kHz, which is an approximate upper limit on narrowband telephonic speech. The rest of the procedure evaluates conditions which might justify changing f_cutoff. There may be some practical limits on how much f_cutoff should change from this value, e.g., no less than about 2.5 kHz and no more than about 5 kHz. For example, there may be unacceptable loss of speech information if components below the lower limit are filtered. As to the higher limit, there may be reduced benefits in the ASE model processing frequencies that extend past the higher limit, as well as there possibly being excessive noise or less useful speech components above the higher limit.

At block 401, which represents the entry point of an infinite loop, the average of posteriori-SNR estimates for frequency bands that are below the current cut-off frequency are calculated. This calculation is used to determine whether to set a new cutoff frequency as shown in blocks 404-410, which will be described in greater detail below. Setting a new cutoff frequency may have impacts in downstream processes in the signal path, and so block 402 is used to limit the frequency of cut-off frequency updates.

Note that, in reference again to FIG. 2, the ASE processor 205 may include a machine learning model trained on spectra defined by a specific f_cutoff of the low pass filter 204. Therefore, a change in f_cutoff may involve making changes to the ASE processor 205 (see block 407 in FIG. 4), such as using a different set of weights and biases applied to a neural network, using a different network structure, etc. Such changes to the ASE processor 205 may be computationally expensive and may have other side effects, e.g., introducing unwanted artifacts into the audio stream. As a result, if f_cutoff is changeable during use, the system may introduce some checks to ensure that f_cutoff does not change too frequently.

Figure 4B:
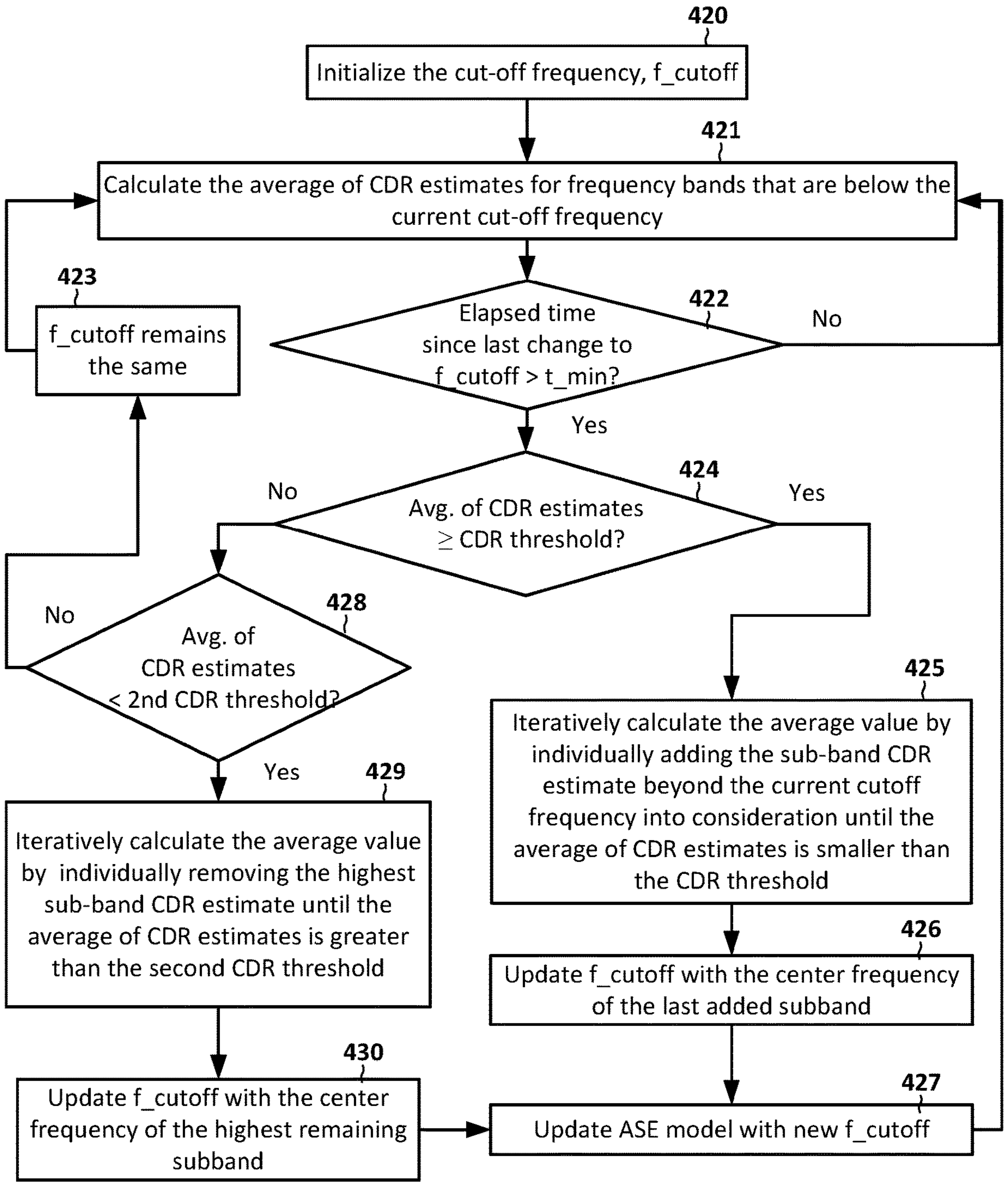

In the example shown in FIG. 4, the decision block 402 checks whether the last change to f_cutoff occurred greater than a minimum elapsed time t_min. If so, then a new f_cutoff can be calculated and used as shown in subsequent blocks. Note that the use of elapsed time is only one example of how to limit "churning" of f_cutoff. In other examples, a running average of the posteriori-SNR estimates calculated at block 401 could be used to determine whether changes to the noise profile is shorter term or longer term, and this could be used with or without elapsed time checks. Also note that the elapsed time could be checked elsewhere in the program loop. For example, after a change in f_cutoff, the calculation of SNR at block 401 could be suspended until at least time t_min has elapsed.

Once sufficient time has passed (and/or other criteria are satisfied) and block 402 returns 'yes,' a decision whether to change f_cutoff begins at block 404. At block 404, it is determined whether the average of posteriori-SNR estimates determined at block 401 is greater than or equal to the predetermined SNR threshold (e.g., −6 dB). This indicates that additional high frequency information may be incorporated into the signal processing. If block 404 returns 'yes,' a new, higher, f_cutoff may be determined and updated as shown in the following blocks 405-406.

Blocks 405-406 detail how a new f_cutoff can be calculated. Generally, this involves iteratively calculating 405 the average posteriori SNR by individually adding the sub-band posteriori-SNR estimates beyond f_cutoff into consideration until the average of posteriori-SNR estimates is smaller than the SNR threshold. The value of f_cutoff is updated 406 with the center frequency of the lastly added sub-band in block 405, which would generally correspond to the highest frequencies of the newly considered sub-bands.

If it is determined at block 404 that the average of posteriori-SNR estimates is smaller than the predetermined SNR threshold (block 404 returns 'no'), a second check may be made as shown at block 408 to see of the average SNR estimate is smaller than a second threshold (e.g., −9 dB). If not, then the average of posteriori-SNR estimate is within an acceptable range and f_cutoff remains the same as shown in block 403. If block 408 returns 'yes," then the average SNR estimate may be too low, and as shown in block 409, the average SNR is recalculated by removing high frequency sub-bands until the SNR estimate is less than the second threshold. At block 410, f_cutoff is updated with the center frequency of the highest remaining sub-band. In the alternate, instead of performing the calculation in block 409 if block 408 returns 'yes,' block 410 could involve reverting the value of f_cutoff to the initial value set in block 400. If f_cutoff is changed at blocks 406 or 410, this may also require updating 407 the ASE model based on the new f_cutoff. Other system components may also be changed in response to a change in f_cutoff, such as the LPC analyzer 207 shown in FIG. 2.

In FIG. 4A, a flowchart shows an example of how f_cutoff may be actively adjusted based on CDR according to another example embodiment. The procedure could be implemented separately or together with the procedure in FIG. 4A. In the latter case, some operations may be merged, such as initializing 400, 420 the cut-off frequency, determining elapsed time (or other condition) since last update of f_cutoff 402, 422, and updating 407, 427 the ASE model with a new f_cutoff.

At block 421, which represents the entry point of an infinite loop, the average of CDR estimates for frequency bands that are below the current cut-off frequency are calculated. The decision block 422 checks whether the last change to f_cutoff occurred greater than a minimum elapsed time t_min, or some other criteria is described as in relation to FIG. 4A. Once sufficient time has passed (and/or other criteria are satisfied) and block 422 returns 'yes,' a decision whether to change f_cutoff begins at block 424. At block 424, it is determined whether the average of CDR estimates determined at block 421 is greater than or equal to the predetermined CDR threshold. This indicates that additional high frequency information may be incorporated into the signal processing. If block 424 returns 'yes,' a new, higher, f_cutoff may be determined and updated as shown in the following blocks 425-426.

Blocks 425-426 detail how a new f_cutoff can be calculated. Generally, this involves iteratively calculating 425 the average CDR by individually adding the sub-band CDR estimates beyond f_cutoff into consideration until the average of CDR estimates is smaller than the CDR threshold. The value of f_cutoff is updated 426 with the center frequency of the lastly added sub-band in block 425, which would generally correspond to the highest frequencies of the newly considered sub-bands.

If it is determined at block 424 that the average of CDR estimates is smaller than the predetermined CDR threshold (block 424 returns 'no'), a second check may be made as shown at block 428 to see of the average CDR estimate is smaller than a second threshold. If not, then the average of CDR estimate is within an acceptable range and f_cutoff remains the same as shown in block 423. If block 428 returns 'yes," then the average CDR estimate may be too low, and as shown in block 429, the average CDR is recalculated by removing high frequency sub-bands until the CDR estimate is less than the second threshold. At block 430, f_cutoff is updated with the center frequency of the highest remaining sub-band. In the alternate, instead of performing the calculation in block 429 if block 428 returns 'yes,' block 430 could involve reverting the value of f_cutoff to the initial value set in block 420. If f_cutoff is changed at blocks 426 or 430, this may also require updating 427 the ASE model based on the new f_cutoff. Other system components may also be changed in response to a change in f_cutoff, such as the LPC analyzer 207 shown in FIG. 2.

In summary, a speech enhancement scheme utilizes advanced speech enhancement processing for low frequency bands and BWE for high frequency bands. The bandwidth extension scheme provides improved speech enhancement or de-noising tool in the high frequency bands. Using just the low frequency bands for speech enhancement reduces the complexity of advanced enhancement schemes. An optional adaptive scheme can actively adjust the cut-off frequency that separates the high and low frequency bands based on the estimate of posteriori SNR and/or CDR (which are typically calculated in classic speech enhancement schemes). These implementations can be used in any ear-worn electronic device, such as a hearing aid.

Figure 5:
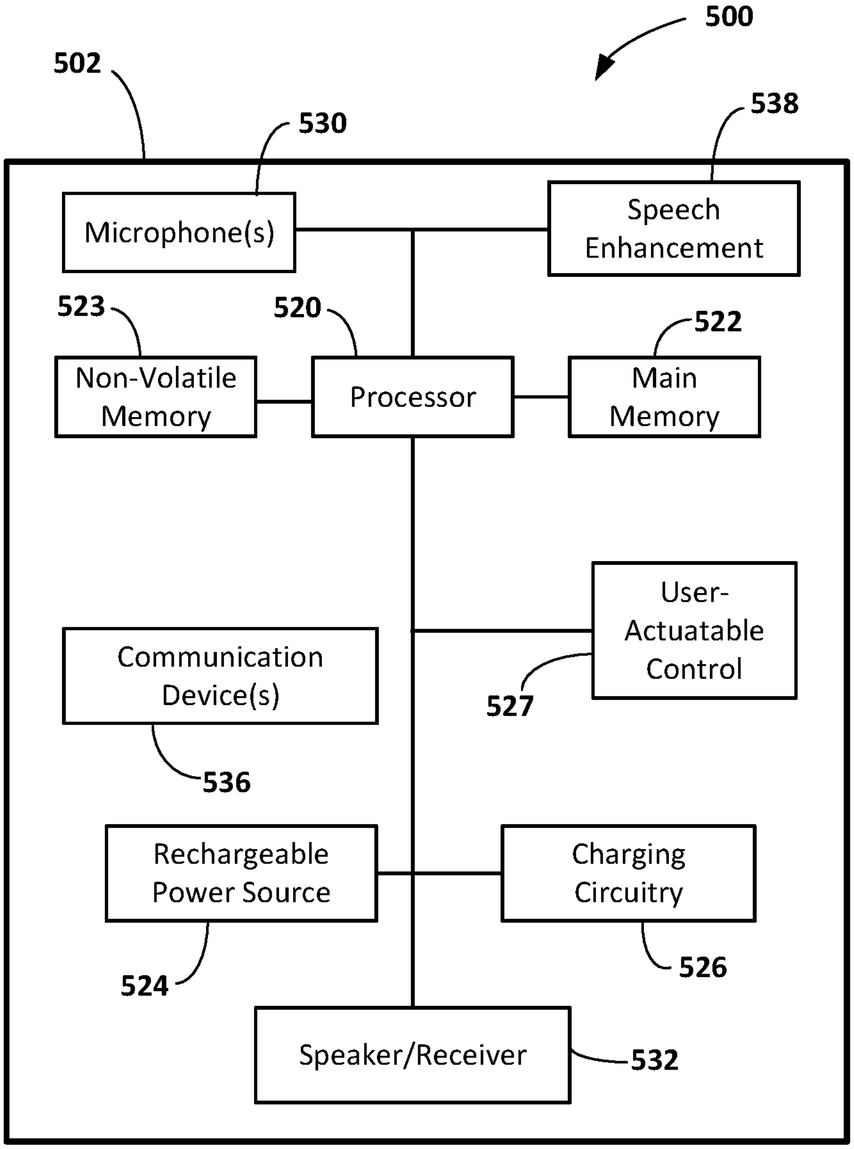
FIG. 5 is a block diagram of an apparatus according to an example embodiment.
Figure 6:
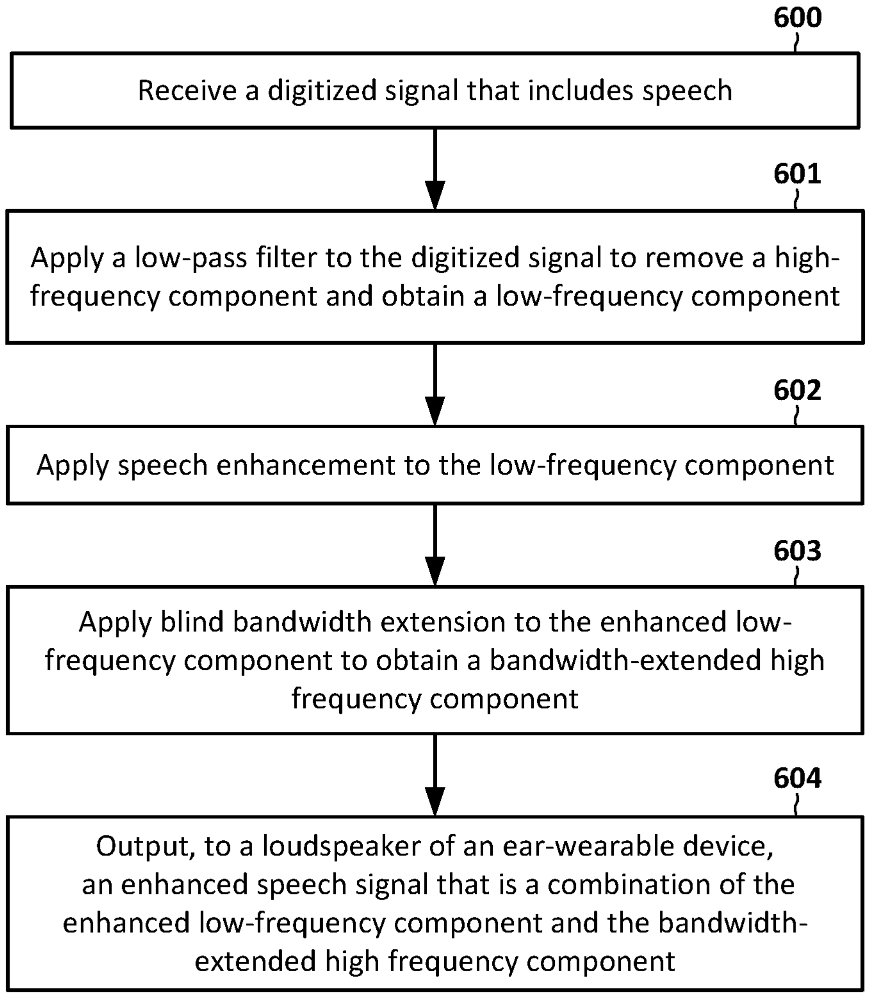
FIG. 6 is a flowchart of a method according to an example embodiment.

In FIG. 5, a block diagram illustrates an ear-worn electronic device 500 in accordance with any of the embodiments disclosed herein. The hearing device 500 includes a housing 502 configured to be worn in, on, or about an ear of a wearer. The hearing device 500 shown in FIG. 5 can represent a single hearing device configured for monaural or single-ear operation or one of a pair of hearing devices configured for binaural or dual-ear operation. The hearing device 500 shown in FIG. 5 includes a housing 502 within or on which various components are situated or supported. The housing 502 can be configured for deployment on a wearer's ear (e.g., a behind-the-ear device housing), within an ear canal of the wearer's ear (e.g., an in-the-ear, in-the-canal, invisible-in-canal, or completely-in-the-canal device housing) or both on and in a wearer's ear (e.g., a receiver-in-canal or receiver-in-the-ear device housing).

The hearing device 500 includes a processor 520 operatively coupled to a main memory 522 and a non-volatile memory 523. The processor 520 can be implemented as one or more of a multi-core processor, a digital signal processor (DSP), a microprocessor, a programmable controller, a general-purpose computer, a special-purpose computer, a hardware controller, a software controller, a combined hardware and software device, such as a programmable logic controller, and a programmable logic device (e.g., FPGA, ASIC). The processor 520 can include or be operatively coupled to main memory 522, such as RAM (e.g., DRAM, SRAM). The processor 520 can include or be operatively coupled to non-volatile memory 523, such as ROM, EPROM, EEPROM or flash memory. As will be described in detail hereinbelow, the non-volatile memory 523 is configured to store instructions that facilitate ASE on a low-band signal and BWE to recover/synthesize high frequencies for audio reproduction.

The hearing device 500 includes an audio processing facility operably coupled to, or incorporating, the processor 520. The audio processing facility includes audio signal processing circuitry (e.g., analog front-end, analog-to-digital converter, digital-to-analog converter, DSP, and various analog and digital filters), a microphone arrangement 530, and a speaker or receiver 532. The microphone arrangement 530 can include one or more discrete microphones or a microphone array(s) (e.g., configured for microphone array beamforming). Each of the microphones of the microphone arrangement 530 can be situated at different locations of the housing 502. It is understood that the term microphone used herein can refer to a single microphone or multiple microphones unless specified otherwise.

The hearing device 500 may also include a user interface with a user-actuatable control 527 operatively coupled to the processor 520. The user-actuatable control 527 is configured to receive an input from the wearer of the hearing device 500. The input from the wearer can be any type of user input, such as a touch input, a gesture input, or a voice input. The user-actuatable control 527 may be configured to receive an input from the wearer of the hearing device 500 to change speech enhancement parameters of the hearing device 500, such as enabling/disabling of speech enhancement, fixed or adaptable cutoff frequency, etc. Other parameters, such as upper and lower bounds the adaptable cutoff frequency may be set by a user or technician, e.g., to adapt performance to suit the level of hearing impairment of the user of the device.

The hearing device 500 also includes a speech enhancement module 538 operably coupled to the processor 520. The speech enhancement module 538 can be implemented in software, hardware, or a combination of hardware and software. The speech enhancement module 538 can be a component of, or integral to, the processor 520 or another processor (e.g., a DSP) coupled to the processor 520. The speech enhancement module 538 is configured to detect speech in different types of acoustic environments. The different types of sound can include speech, music, and several different types of noise (e.g., wind, transportation noise and vehicles, machinery), etc., and combinations of these and other sounds (e.g., transportation noise with speech).

According to various embodiments, the speech enhancement module 538 can be configured to filter out audio signals above a cutoff frequency such that only a lower frequency component of the audio signals is subject to speech enhancement via a machine learning algorithm. Such machine learning enhancement may be performed, for example, via a DNN, CNN, RNN, etc. Generally, these neural networks are trained to detect speech patterns in the presence of noise, and can be used to improve the detectability of the speech by a listener through isolation and amplification of the speech patterns and/or attenuation of the noise.

The hearing device 500 can include one or more communication devices 536 coupled to one or more antenna arrangements. For example, the one or more communication devices 536 can include one or more radios that conform to an IEEE 802.11 (e.g., WiFi®) or Bluetooth® (e.g., BLE, Bluetooth® 4.2, 5.0, 5.1, 5.2 or later) specification, for example. In addition, or alternatively, the hearing device 500 can include a near-field magnetic induction (NFMI) sensor (e.g., an NFMI transceiver coupled to a magnetic antenna) for effecting short-range communications (e.g., ear-to-ear communications, ear-to-kiosk communications).

The hearing device 500 also includes a power source, which can be a conventional battery, a rechargeable battery (e.g., a lithium-ion battery), or a power source comprising a supercapacitor. In the embodiment shown in FIG. 5, the hearing device 500 includes a rechargeable power source 524 which is operably coupled to power management circuitry for supplying power to various components of the hearing device 500. The rechargeable power source 524 is coupled to charging circuitry 526. The charging circuitry 526 is electrically coupled to charging contacts on the housing 502 which are configured to electrically couple to corresponding charging contacts of a charging unit when the hearing device 500 is placed in the charging unit.

This document discloses numerous embodiments, including but not limited to the following:

Aspect 1. A method comprising:

receiving a digitized signal that includes speech; applying a low-pass filter to the digitized signal to remove a high-frequency component and obtain a low-frequency component; applying speech enhancement to the low-frequency component; applying blind bandwidth extension to the enhanced low-frequency component to obtain a bandwidth-extended high frequency component that is an estimate of the high frequency component; and outputting, to a loudspeaker of an ear-wearable device, an enhanced speech signal that is a combination of the enhanced low-frequency component and the bandwidth-extended high frequency component.

Aspect 2. The method of aspect 1, further comprising performing linear predictive coding (LPC) on the digitized signal after the low-pass filter is applied, an analysis filter of the LPC being used for predicting an enhanced low-frequency excitation signal which is used as input to excitation signal extension.

Aspect 3. The method of aspect 2, wherein coefficients of the LPC are used to extend a spectral envelope of an output of the excitation signal extension.

Aspect 4. The method of aspect 3, wherein a subset of the LPC coefficient are selected for spectral envelope extension based on a level of hearing loss of a user of the ear-wearable electronic device.

Aspect 5. The method of any of aspects 1-4, wherein the speech enhancement is performed in a frequency domain, and the blind bandwidth extension is performed in a time domain.

Aspect 6. The method of any of aspects 1-5, wherein the speech enhancement is performed by a neural network.

Aspect 7. The method of any of aspect 1-6, wherein the removal of the high frequency component reduces a complexity of the speech enhancement.

Aspect 8. The method of any of aspect 1-7, wherein a cutoff frequency of the low-pass filter is updated during use of the ear-wearable device based on a change in signal quality estimates for frequency bands below the cutoff frequency, wherein the signal quality estimates comprise at least one of a posteriori signal-to-noise-ratio (SNR) and a coherent-to-diffuse power ratio (CDR).

Aspect 9. The method of aspect 8, wherein the cutoff frequency is updated if the average of the signal quality estimates for frequency bands below the cutoff frequency is greater than a threshold.

Aspect 10. The method of aspect 9, wherein a new value of the cutoff frequency is determined based on iteratively updating the average with signal quality estimates of additional sub-bands greater than the cutoff frequency until the updated average is less than the threshold, the new value of the cutoff frequency being based on a highest frequency sub-band of the additional sub-bands.

Aspect 11. The method of any of aspects 1-7, wherein a cutoff frequency of the low-pass filter is updated during use of the ear-wearable device based on a change in coherent to diffuse ratio of the digitized speech.

Aspect 12. The method of any of aspects 1-7, wherein a cutoff frequency of the low-pass filter is updated during use of the ear-wearable device based on a combination of: a change in posteriori signal-to-noise-ratio (SNR) estimates for frequency bands below the cutoff frequency; and a change in coherent to diffuse ratio (CDR) of the digitized speech.

Aspect 13. An ear-wearable electronic device, comprising: at least one microphone configured to convert sound that includes speech to an electrical signal; a loudspeaker; an analog to digital converter that converts the electrical signal to a digitized signal; and a processor operably coupled to the microphone, the loudspeaker, and the analog to digital converter, the processor operable to: apply a low-pass filter to the digitized signal to remove a high-frequency component and obtain a low-frequency component; applying speech enhancement to the low-frequency component; applying blind bandwidth extension to the enhanced low-frequency component to recover or synthesize an estimate of at least part of the high frequency component; and output an enhanced speech signal via the loudspeaker that is a combination of the enhanced low-frequency component and the bandwidth-extended high frequency component.

Aspect 14. The ear-wearable electronic device of aspect 13, wherein the processor is further configured to perform linear predictive coding (LPC) on the digitized signal after the low-pass filter is applied, an analysis filter of the LPC being used for predicting an enhanced low-frequency excitation signal which is used as input to excitation signal extension.

Aspect 15. The ear-wearable electronic device of aspect 14, wherein coefficients of the LPC are used to extend a spectral envelope of an output of the excitation signal extension.

Aspect 16. The ear-wearable electronic device of aspect 15, wherein a subset of the LPC coefficient are selected for spectral envelope extension based on a level of hearing loss of a user of the ear-wearable device.

Aspect 17. The ear-wearable electronic device of any of aspects 13-16, wherein the speech enhancement is performed in a frequency domain, and the blind bandwidth extension is performed in a time domain.

Aspect 18. The ear-wearable electronic device of any of aspects 13-17, wherein the speech enhancement is performed by a neural network.

Aspect 19. The ear-wearable electronic device of any of aspects 13-18, wherein the removal of the high frequency component reduces a complexity of the speech enhancement.

Aspect 20. The ear-wearable electronic device of any of aspects 13-19, wherein a cutoff frequency of the low-pass filter is updated during use of the ear-wearable device based on a change in signal quality estimates for frequency bands below the cutoff frequency, wherein the signal quality estimates comprise at least one of a posteriori signal-to-noise-ratio (SNR) and a coherent-to-diffuse power ratio (CDR).

Aspect 21. The ear-wearable electronic device of aspect 20, wherein the cutoff frequency is updated if the average of the signal quality estimates for frequency bands below the cutoff frequency is greater than a threshold.

Aspect 22. The ear-wearable electronic device of aspect 21, wherein a new value of the cutoff frequency is determined based on iteratively updating the average with signal quality estimates of additional sub-bands greater than the cutoff frequency until the updated average is less than the threshold, the new value of the cutoff frequency being based on a highest frequency sub-band of the additional sub-bands.

Aspect 23. The ear-wearable electronic device of any of aspects 13-19, wherein a cutoff frequency of the low-pass filter is updated during use of the ear-wearable device based on a change in coherent to diffuse ratio of the digitized speech.

Aspect 24. The ear-wearable electronic device of any of aspects 13-19, wherein a cutoff frequency of the low-pass filter is updated during use of the ear-wearable device based on a combination of: a change in posteriori signal-to-noise-ratio (SNR) estimates for frequency bands below the cutoff frequency; and a change in coherent to diffuse ratio (CDR) of the digitized speech.

Aspect 25. An ear-wearable electronic device, comprising: at least one microphone configured to convert sound that includes speech to an electrical signal; a low-pass filter that obtains a low-frequency component from the electrical signal; a speech enhancement processor that uses machine-learning to produce a narrowband enhanced excitation signal from the low-frequency component; an excitation extension module that frequency-extends the enhanced narrowband excitation signal to a wideband enhanced excitation signal; a linear predictive coder (LPC) that produces a spectral envelope extension from the low-frequency component; and a loudspeaker that converts an enhanced speech signal into audio, the enhanced speech signal comprising a convolution of the wideband enhanced excitation signal and the spectral envelope extension.

Aspect 26. The ear-wearable electronic device of aspect 25, wherein a subset of LPC coefficient from the LPC are selected for spectral envelope extension based on a level of hearing loss of a user of the ear-wearable electronic device.

Aspect 27. The ear-wearable electronic device of aspect 25 or 26, wherein the speech enhancement processor operates in a frequency domain, and the LPC operates in a time domain.

Aspect 28. The ear-wearable electronic device of any of aspects 25-27, wherein the speech enhancement processor comprises a neural network.

Aspect 29. The ear-wearable electronic device of any of aspects 25-28, wherein the low-pass filter reduces a complexity of the speech enhancement processor.

Aspect 30. The ear-wearable electronic device of any of aspects 25-29, wherein a cutoff frequency of the low-pass filter is updated during use of the ear-wearable device based on a change in posteriori signal quality estimates for frequency bands below the cutoff frequency, wherein the signal quality estimates comprise at least one of a posteriori signal-to-noise-ratio (SNR) and a coherent-to-diffuse power ratio (CDR).

Aspect 31. The ear-wearable electronic device of aspect 30, wherein the cutoff frequency is updated if the average of the signal quality estimates for frequency bands below the cutoff frequency is greater than a threshold.

Aspect 32. The ear-wearable electronic device of aspect 31, wherein a new value of the cutoff frequency is determined based on iteratively updating the average with signal quality estimates of additional sub-bands greater than the cutoff frequency until the updated average is less than the threshold, the new value of the cutoff frequency being based on a highest frequency sub-band of the additional sub-bands.

Aspect 33. The ear-wearable electronic device of any of aspects 25-29, wherein a cutoff frequency of the low-pass filter is updated during use of the ear-wearable device based on a change in coherent to diffuse ratio of the digitized speech.

Aspect 34. The ear-wearable electronic device of any of aspects 25-29, wherein a cutoff frequency of the low-pass filter is updated during use of the ear-wearable device based on a combination of: a change in posteriori signal-to-noise-ratio (SNR) estimates for frequency bands below the cutoff frequency; and a change in coherent to diffuse ratio of the digitized speech.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of" "consisting of" and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

The invention claimed is:

1. A method comprising:

receiving a digitized signal that includes speech;

applying a low-pass filter at a cut-off frequency to the digitized signal to remove a high-frequency component and obtain a low-frequency component;

applying speech enhancement to the low-frequency component;

applying blind bandwidth extension to the enhanced low-frequency component to obtain a bandwidth-extended high frequency component that is an estimate of the high frequency component;

outputting, to a loudspeaker of an ear-wearable device, an enhanced speech signal that is a combination of the enhanced low-frequency component and the bandwidth-extended high frequency component; and updating the cutoff frequency of the low-pass filter during use of the ear-wearable device based on iteratively updating an average of the signal quality estimates for frequency bands below the cutoff frequency with signal quality estimates of additional sub-bands greater than the cutoff frequency until the updated average is less than the threshold, the updated cutoff frequency being based on a highest frequency sub-band of the additional sub-bands.

2. The method of claim 1, further comprising performing linear predictive coding (LPC) on the digitized signal after the low-pass filter is applied, an analysis filter of the LPC being used for predicting an enhanced low-frequency excitation signal which is used as input to excitation signal extension, wherein coefficients of the LPC are used to extend a spectral envelope of an output of the excitation signal extension, wherein a subset of the LPC coefficients are selected for spectral envelope extension based on a level of hearing loss of a user of the ear-wearable electronic device.

3. The method of claim 1, wherein the speech enhancement is performed in a frequency domain, and the blind bandwidth extension is performed in a time domain.

4. The method of claim 1, wherein the removal of the high frequency component reduces a complexity of the speech enhancement.

5. The method of claim 1, wherein the signal quality estimates comprise at least one of a posteriori signal-to-noise-ratio (SNR) and a coherent-to-diffuse power ratio (CDR).

6. The method of claim 1, wherein the cutoff frequency is updated if the average of the signal quality estimates for frequency bands below the cutoff frequency is greater than a threshold.

7. The method of claim 1, wherein the cutoff frequency of the low-pass filter is updated during use of the ear-wearable device based on a change in coherent to diffuse ratio of the digitized speech.

8. The method of claim 1, wherein the cutoff frequency of the low-pass filter is updated during use of the ear-wearable device based on a combination of:

a change in posteriori signal-to-noise-ratio (SNR) estimates for frequency bands below the cutoff frequency; and a change in coherent to diffuse ratio (CDR) of the digitized speech.

9. The method of claim 1, wherein applying the speech enhancement to the low-frequency component comprises speech detection via a neural network.

10. An ear-wearable electronic device, comprising:

at least one microphone configured to convert sound that includes speech to an electrical signal;

a loudspeaker;

an analog to digital converter that converts the electrical signal to a digitized signal; and a processor operably coupled to the microphone, the loudspeaker, and the analog to digital converter, the processor operable to:

apply a low-pass filter at a cut-off frequency to the digitized signal to remove a high-frequency component and obtain a low-frequency component;

applying speech enhancement to the low-frequency component;

applying blind bandwidth extension to the enhanced low-frequency component to recover or synthesize an estimate of at least part of the high frequency component; and output an enhanced speech signal via the loudspeaker that is a combination of the enhanced low-frequency component and the bandwidth-extended high frequency component; and update the cutoff frequency of the low-pass filter during use of the ear-wearable device based on iteratively updating an average of the signal quality estimates for frequency bands below the cutoff frequency with signal quality estimates of additional sub-bands greater than the cutoff frequency until the updated average is less than a threshold, the updated value of the cutoff frequency being based on a highest frequency sub-band of the additional sub-bands.

11. The ear-wearable electronic device of claim 10, wherein the processor is further configured to perform linear predictive coding (LPC) on the digitized signal after the low-pass filter is applied, an analysis filter of the LPC being used for predicting an enhanced low-frequency excitation signal which is used as input to excitation signal extension, wherein coefficients of the LPC are used to extend a spectral envelope of an output of the excitation signal extension, wherein a subset of the LPC coefficients are selected for spectral envelope extension based on a level of hearing loss of a user of the ear-wearable electronic device.

12. The ear-wearable electronic device of claim 10, wherein the speech enhancement is performed in a frequency domain, and the blind bandwidth extension is performed in a time domain.

13. The ear-wearable electronic device of claim 10, wherein the signal quality estimates comprise at least one of a posteriori signal-to-noise-ratio (SNR) and a coherent-to-diffuse power ratio (CDR).

14. The ear-wearable electronic device of claim 13, wherein the cutoff frequency is updated if the average of the signal quality estimates for frequency bands below the cutoff frequency is greater than a threshold.

15. The ear-wearable electronic device of claim 10, wherein the cutoff frequency of the low-pass filter is updated during use of the ear-wearable device based on a change in coherent to diffuse ratio of the digitized speech.

16. The ear-wearable electronic device of claim 10, wherein the cutoff frequency of the low-pass filter is updated during use of the ear-wearable device based on a combination of:

a change in posteriori signal-to-noise-ratio (SNR) estimates for frequency bands below the cutoff frequency; and a change in coherent to diffuse ratio (CDR) of the digitized speech.

17. An ear-wearable electronic device, comprising:

at least one microphone configured to convert sound that includes speech to an electrical signal;

a low-pass filter that obtains a low-frequency component from the electrical signal;

a speech enhancement processor that uses machine-learning to produce a narrowband enhanced excitation signal from the low-frequency component;

an excitation extension module that frequency-extends the enhanced narrowband excitation signal to a wideband enhanced excitation signal;

a linear predictive coder (LPC) that produces a spectral envelope extension from the low-frequency component; and a loudspeaker that converts an enhanced speech signal into audio, the enhanced speech signal comprising a convolution of the wideband enhanced excitation signal and the spectral envelope extension, wherein a cutoff frequency of the low-pass filter is updated during use of the ear-wearable device based on iteratively updating an average of the signal quality estimates for frequency bands below the cutoff frequency with signal quality estimates of additional sub-bands greater than the cutoff frequency until the updated average is less than the threshold, the updated cutoff frequency being based on a highest frequency sub-band of the additional sub-bands, wherein the signal quality estimates comprise at least one of a posteriori signal-to-noise-ratio (SNR) and a coherent-to-diffuse power ratio (CDR).

18. The ear-wearable electronic device of claim 17, wherein the excitation extension module frequency-extends the enhanced narrowband excitation signal to recover or synthesize a high frequency range.

* * * * *